United States Patent Office 3,558,331
Patented Jan. 26, 1971

3,558,331
EASY PEEL FOOD CASINGS
Elio E. Tarika, Flossmoor, Ill., assignor to Union Carbide Corporation, a corporation of New York
No Drawing. Filed Feb. 7, 1968, Ser. No. 703,530
Int. Cl. A22c 13/00
U.S. Cl. 99—176                                   9 Claims

ABSTRACT OF THE DISCLOSURE

A release agent is applied to the interior wall of a length of tubular food casing as the food casing is being shirred. The food casing having the release agent applied thereto exhibits improved peelability characteristics from a food product stuffed and processed therein.

---

This invention relates to a method for producing food casings which exhibit improved peelability characteristics from food products stuffed and processed therein. More particularly, this invention relates to a method for applying a release agent to the interior wall of a food casing as the casing is being shirred and to the food casings obtained therefrom.

Food casings are typically produced from such materials as cellulose, regenerated cellulose, and the like. Fibrous webs can also be embedded in these food casings and such casings are commonly termed in the art as "fibrous food casings." The method of applying a release agent of this invention to the interior wall of these food casings as they are being shirred, therefor, is applicable to cellulose and fibrous food casings as well as food casings obtained from other natural and synthetic materials which include but are not limited to such materials as collagen, amylose, starches, alginates and the like.

These food casings are generally hydrophillic and have multi-functional purposes in that they are used as containers or molds during the processing of food products stuffed therein and also serve as a protective wrapping for the processed food product. In many instances, however, these food casings are removed from the products stuffed and processed therein so that the products can be packaged, such as one or two pound packages of skinless frankfurters, or be sliced and then packaged in predetermined weight units to be retailed.

Those food casings which are generally utilized to obtain food products such as vienna sausage, frankfurters, chub sausages and the like, are typically fabricated from continuous lengths of tubular casings measuring from about 55 feet to 88 feet and longer in length and from about ⅜ inch to 2½ inches or more in flat width. These continuous lengths are formed into shirred casing sticks which are then stuffed with a food emulsion or a food product and subjected to further processing to obtain encased, processed food products.

Shirred casing sticks are typically obtained by forming pleats in a continuous, inflated length of tubular casing as it is advanced over a mandrel, compacting and then compressing the thusly pleated tubular length to obtain a relatively short, rigid tubular article commonly referred to in the art as a "shirred casing stick." These shirred casing sticks generally measure from about 11 inches to 22 inches in length. Typical methods and apparatus employed to shirr tubular lengths of casing to obtain shirred casing sticks are disclosed and described in U.S. Pat. 2,984,574 to Matecki and in U.S. Pat. 3,110,058 to Marbach.

Those food casings utilized to obtain such products as "skinless frankfurters," are peeled and stripped from the processed frankfurters. The cooking and curing of these frankfurters gives rise to the development of a natural "skin" on the outer surfaces of the encased frankfurters. This natural "skin" consists of the coagulated proteinaceous material present in the meat emulsion from which the frankfurters are formulated. During the cooking and curing of these frankfurters, the proteinaceous material comes into contact with the inner surface of the casing wall and coagulates and hardens sufficiently to form a natural "skin." When the casings are subsequently removed or peeled, skinless frankfurters are obtained.

Hence, when utilizing food casings which are to be subsequently removed from a food product such as frankfurters it is desirable not only to obtain casings in which these products can be readily processed but which will also exhibit good peelability characteristics so that when the casing is peeled from the processed food product, the surface of the product will not be damaged such as by scarring or marring.

In many commercial operations, food casings are peeled from the food products processed therein, by the use of various types of high-speed, automatic peeling apparatus. Those utilized to peel the casings from frankfurters, for example, are adapted to strip the casings from the frankfurters thereby exposing the natural "skin" of the frankfurters. Typical of the methods, and apparatus employed to accomplish this are those such as are disclosed and described in U.S. Pat. 2,424,346 to Wilcoxon, U.S. Pat. 2,514,660 to McClure et al., U.S. Pat. 2,686,927 to Greg and U.S. Pat. 2,757,409 to Parkers et al. The methods and apparatus disclosed and described in these patents for removing casings from the food products stuffed and processed therein include utilizing a jet of fluid in cooperation with a slitting means, spirally unwinding the casings as the linked food products are advanced, and means to pull the casing from the food product after the casing has been longitudinally slit.

When food casings exhibit too great an affinity for or adherence to the food product processed therein, the casings can not be effectively and efficiently removed. For example, the tendency of a casing to adhere to the natural "skin" formed on the surface of frankfurter or sausage type products often results in the natural "skin" being pulled away from the body of the products during the casing peeling operation thereby rendering them unsightly and commercially unacceptable.

For different frankfurter or sausage type products, the meat emulsion formulations prepared contain varying ratios of such ingredients as skeletal beef and pork tissue and meat as well as pork skins, snouts, joints, connective tissue and the like. Generally, food products obtained from meat emulsions having a relatively high skeletal tissue and meat content and a relatively low amount of the other ingredients mentioned hereinabove are readily processed in conventionally employed cellulosic casings and little difficulty is encountered in removing these casings from the processed food products containing a high skeletal tissue and meat content resulting in little or no damage by marring or scarring the product. However, food products obtained from meat emulsions containing a relatively high percentage of collagenous material, such as pork skins, snouts, joints, connective tissue and the like, exhibit a tendency to adhere to the casings in which they are processed. As a result, the surfaces of the stuffed and processed praducts are often damaged by being marred or scarred when the casings are subsequently removed.

Heretofore, many attempts have been made to provide casings having a peeling or release agent on their walls. For example, as disclosed and described in U.S. Patent 3,307,956 to Chiu et al., food casings have had peeling or release agents applied to their walls by passing a tubular length of casing through a solution containing a peeling or release agent as fabrication of the casing is being completed. When the casing is passed through a solution, the peeling or release agent contained therein is soluble or diffusible and is permitted to permeate the casing wall after which the casing is subjected to heat in order to render the peeling or release agent insoluble in water.

Generally, these methods have met with success when the casings obtained therefrom have been utilized to process meat emulsions having relatively low amounts of collagenous material but have not been completely satisfactory, efficient or effective when utilized to obtain products containing relatively high amounts of collagenous material.

It is an object of this invention, therefore, to provide a simple and effective method for applying a release agent to a tubular food casing so that there is obtained therefrom a food casing which exhibits improved peelability characteristic from food products having relatively high amounts of collagenous materials and which are stuffed and processed therein.

Another object of this invention is to provide a simple and effective method for applying a release agent to the interior of an inflated length of tubular food casing as it is being shirred.

These and further objects of the invention will become more apparent from the ensuing discussion thereof.

The objects of this invention can be generally attained by applying a coating consisting of a release agent to a tubular length of food casing as the casing is being shirred.

The apparatus which can be employed to practice this invention can be selected from a number of apparatus commercially available which generally comprise means for inflating a tubular length of casing; means for advancing the thusly inflated tubular casing over and about an internal mandrel which is provided with means for communicating with a source of casing inflation air; and means for shirring and then compacting and compressing the tubular length of casing to obtain a shirred casing stick.

The term "shirring" as employed throughout this application and in the appended claims, is intended to refer to and should be understood as referring to those operations performed on a tubular length of food casing which include but are not limited to such steps as inflating, lubricating, pleating, compacting, severing a predetermined length of casing and then compressing and doffing the severed length of casing from the apparatus. Typical of the apparatus which can be utilized for this purpose are those such as are disclosed and described in U.S. Patents 3,158,896 and 3,110,058 both to Marbach, and U.S. Patents 3,097,393; 2,984,574 and 2,983,949 all to Matecki.

Hence, the release agents of this invention can be applied to the inner wall of a length of tubular food casing by metering the release agents through the means presently utilized to inflate the casing with air and supply metered quantities of a lubricant such as mineral oil to the mandrel as the casing is being shirred. For example, U.S. Pat. 3,110,058 to Marbach discloses and describes a shirring apparatus equipped with means to supply a stream of air through the bore of a hollow mandrel in order to inflate a length of food casing as it is advanced. Metered quantities of a lubricant such as mineral oil are supplied to the stream of inflation air and conveyed thereby in the form of tiny droplets or a spray to the leading end of the mandrel in order to lubricate the mandrel. A mineral oil lubricant is also metered and conveyed to the cogged rolls comprising the shirring means in order to lubricate these cogged rolls as the food casing is being shirred.

Surprisingly, it has been found that the release agents of this invention can not only be applied to the inner wall of the casing in lieu of the lubricant and act as the lubricant during shirring of the casing but will also serve their intended purposes as a release agent in the casing.

The release agent which can be employed in this invention can be generally designated as an organosiloxane. Typical organosiloxanes which can be employed are commercially available silicone compounds such as those selected from the class having the general formulae

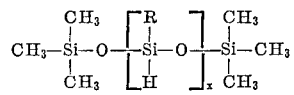

wherein $x$ is an integer of at least 1 and R is an alkyl group such as methyl, ethyl, propyl and the like; an aryl group such as phenyl, naphthyl and the like; an aralkyl group such as benzyl, phenylethyl, and the like; an alkaryl group such as tolyl, ethylphenyl, xylyl and the like; and organosiloxane mixtures wherein R can be different radical groups, and

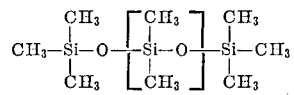

Examples of these commercially obtainable organosiloxane compounds are a dimethylpolysiloxane which can have a viscosity of from about 0.65 to 1,000,000 centistokes, is stable in the presence of air at 150° C., exhibits negligible vapor pressure, and which is available under product designations L–31 and L–45 produced by Union Carbide Corporation, and trimethyl siloxane end blocked methyl hydrogen polysiloxane which can have a viscosity at 25° C. of from about 20 to 40 centistokes, is colorless and odorless and which is available under the tradename Silicone Oil 1107.

The minimum amount of release agent to be applied to the inner wall of a food casing by the method of this invention should be that amount which will be effective to impart to the food casing the peelability characteristics desired or required to be obtained. Generally, an amount of about 15 drops per each 84 foot length of casing will be effective to impart peelability characteristics thereto.

The amount of release agent applied will be somewhat dependent upon the type of food casing employed and the nature of food emulsion stuffed and processed therein since each type of food casing and/or food emulsion formulation will exhibit different chemical and physical properties before, during and after being processed. These different chemical and physical properties will, in turn, affect the degree of ease with which the food casing can be removed from the food product processed therein. Hence, the minimum amount of release agent to be applied can be readily determined by those skilled in the art and will become apparent to those practicing the invention. On the other hand, the maximum amount of release agent applied to the inner wall of a foodcasing should not be such that it will subsequently adversely affect removal of the food casing from the stuffed and processed food product or give rise to other adverse effects in the product such as commercially unacceptable texture or color and/or the formation of excessive and commercially unacceptable jelly or fat pockets.

In some instances, the maximum amount of release agent which can be employed will be subject to standards established by the government. For example, in the United States, it is suggested that the maximum amount not exceed about 30 milligrams (mg.) per 100 square inches of tubular casing.

The invention will become more clear when considered together with the following example which is set forth as being merely illustrative of the invention and is not intended, in any manner, to be limitative thereof.

EXAMPLE

Three different types of shirred cellulose casings were employed, each of which had the same flat width and were the same length. Three sets of these casings were shirred on an apparatus, such as the apparatus disclosed and described in the above-identified patent to Marbach (U.S. Pat. 3,110,058), using various agents for treating and/or lubricating the inner walls of the casings. The same meat emulsion formulation was prepared for all three sets of casings and the casings were then stuffed with the meat emulsions, linked and processed into frankfurters in the same manner and under the same conditions. After being processed, the linked frankfurters were inspected and evaluated for adverse fat or jelly pocket formation. The casings were then removed from the frankfurters utilizing the same commercial peeling apparatus and the skinless frankfurter products obtained were then compared and evaluated.

All three sets of casings had a flat width measuring about 1.19 inches and a length measuring about 84 feet. As each continuous 84 foot length of casing was being shirred, there was metered through the shirring mandrel along with the stream of inflation air 15 drops of either a mineral oil or an organosiloxane release agent so that the inner wall of the inflated casing was contacted therewith as it was being shirred. The mineral oil employed weighed about 18.6 milligrams per drop and the organosiloxane release agent employed weighed about 15 milligrams (mg.) per drop. The total area of each length of food casing contacted with the organosiloxane release agent measured about 2400 square inches. Hence, the total amount of release agent which was applied to each 84 foot length of casing, was about 225 mg., or about 10 mg. per 100 square inches of casing wall. For the same area of food casing, the total amount of mineral oil lubricant applied to each 84 foot length of casing was about 280 mg. or about 11 mg. per 100 square inches of casing wall.

The three sets of casings employed are identified as follows:

"Casing A" was a commercially obtained cellulosic casing and was utilized as a control. The 84 foot lengths of casing were shirred, compacted and compressed, according to the method described above. A mineral oil was supplied to the interior of the casing and to the cogged wheels to act as a lubricant during shirring of the casing.

"Casing B" was also a cellulosic casing having a release agent applied thereto by passing a length of the casing through a solution containing the release agent. The release agent dialyzed from the outer surface of the casing to the inner surface of the casing in accordance with the method disclosed and described in U.S. Patent 3,307,956 to Chiu et al., identified hereinabove. The release agent employed was sodium methyl silanolate. "Casing B' was then shirred, compacted and compressed in the same manner as "Casing A," wherein a mineral oil was also supplied to the interior of the casing and to the cogged wheels as it was being shirred.

"Casing C" was a cellulosic casing having trimethyl siloxane end blocked methyl hydrogen polysiloxane as the organosiloxane release agent applied to the inner wall of the casing during the shirring thereof. The same release agent was also supplied to the cogged wheels to serve as a lubricant as the casing was being shirred. Hence, no mineral oil was applied to the interior of the casings or to the cogged wheels as the casings were being shirred.

A frankfurter type meat emulsion was employed and was prepared from a formulation containing beef and pork trimmings, standard amounts of preservatives and additives, and a high content of about 30% by weight collagenous materials comprising pork skins, jowls, snouts, and the like. This formulation was chopped and comminuted according to standard commercial procedures and was then stuffed into the shirred 84 foot lengths of the three types of cellulosic food casings, i.e., "Casing A," "Casing B," and "Casing C."

The thusly stuffed casings were all linked by the same conventional linking apparatus and were all processed in the same manner in a commercial smokehouse by gradually raising the initial temperature of the smokehouse from 140° F. to 180° F. over a 30 minute time period and then maintaining the temperature of the smokehouse at 180° F. until the internal temperature of the encased products reached about 162° F. The internal temperature of the encased products was maintained at 162° F. for a length of time in accordance with commercially accepted standards and practice.

The linked products were then removed from the smokehouse, cooled and stored in a cooler in accordance with the usual methods employed in the art. The linked products were then examined for the occurrence of fat or jelly pockets. If fat or jelly pockets do occur, they generally appear and form between the inner surface of the casing wall and the coagulated meat surface adjacent thereto. Next, all the products were peeled on the same commercial peeling apparatus to obtain skinless frankfurters and the peeling efficiency was determined by examination of all the frankfurters.

The results of these tests are set forth in the table hereinbelow wherein a peeling efficiency rating of "excellent" denotes that the cellulose casing was capable of being automatically stripped from the frankfurters so that less than about 3% to 4% of the product resulted in being waste or being commercially unsaleable; a peeling efficiency rating of "commercially acceptable" denotes a product waste greater than about 4% and less than about 5%; and a peeling efficiency rating of "unacceptable" denotes a product waste in excess of 5%, all the frankfurters having been peeled in the same manner.

The table below also sets forth the results from visually inspecting the frankfurters for fat or jelly pocket formation wherein a rating of "unacceptable" denotes a product having an incidence of fat or jelly pockets which are commercially unacceptable.

TABLE

| Food casing | Peeling efficiency | Fat of jelly pocket formation |
| --- | --- | --- |
| A (control) | Unacceptable | None. |
| B | Unacceptable to commercially acceptable. | Unacceptable. |
| C | Excellent | None. |

As can be seen from the results tabulated above, the control food casing ("Casing A") showed unacceptable peelability efficiency although no fat or jelly pockets were formed. "Casing B," which is representative of present methods of incorporating a release agent therein, showed an unacceptable level of jelly or fat pocket formation and was also not completely acceptable in peeling efficiency. Only "Casing C" which was treated in accordance with this invention, exhibited excellent peeling efficiency as well as no incidence of fat or jelly pocket formation.

It should be noted that the food emulsion formulation contained an exceedingly high content of collagenous materials, such as pork skins. A high content of collagenous material in the food emulsion is generally believed to promote a strong tendency for the processed emulsion to adhere to the inner wall of the casing. Thus, poorer peeling characteristics can generally be anticipated from products containing a high content of such collagenous material. It is significant to note, therefore, that in processing emulsions having a high content of collagenous material, only the food casings treated with the release agent of this invention ("Casing C") exhibit excellent peeling characteristics.

While the present invention has been described with particularity and in some detail, it should be understood that changes, modifications and alterations can be made therein without departing from the scope and spirit of the invention.

What is claimed is:

1. A method for coating the inner wall of a tubular regenerated cellulose food casing with a release agent to obtain a food casing that exhibits improved peelability characteristics from a food product having a relatively high amount of collagenous material and which is stuffed and processed therein, said method including the steps of;

(a) applying to the inner wall of an inflated length of tubular food casing as the food casing is being shirred a lubricating coating consisting solely of an undiluted, uncatalyzed organosiloxane release and lubricating agent having the general formulae,

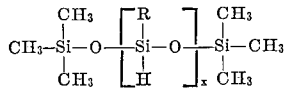

wherein $x$ in an integer of at least 1 and R is a member selected from the class consisting of alkyl, aryl, aralkyl and alkaryl radicals and mixtures thereof wherein R can be different radicals, the minimum quantity of release agent coated on the inner wall of the food casing being an amount effective to enable the food casing to be readily and easily removed from a food product stuffed and processed therein and the maximum quantity of release agent coated on the inner wall of the food casing being less than an amount which would adversely affect removal of the food casing from a food product stuffed and processed therein and which would result in the formation of commercially unacceptable amounts of fat and jelly pockets in the stuffed and processed food product; and, (b) continuing the shirring of and then compacting and compressing the thusly coated food casing until a shirred casing stick is obtained.

2. The method of claim 1 wherein the release and lubricating agent is applied to the inner wall of the food casing by being conveyed thereto by means of the air stream utilized to inflate the tubular food casing.

3. The method of claim 1 wherein the amount of organosiloxane release and lubricating agent applied to the inner wall of the casing is about 15 drops per each 84-foot length of casing.

4. The method of claim 1 wherein the organosiloxane release and lubricating agent is trimethyl siloxane end blocked methyl hydrogen polysiloxane having a viscosity at 25° C. of from about 20 to 40 centistokes.

5. A method for coating the inner wall of a tubular regenerated cellulose food casing with a release agent to obtain a food casing that exhibits improved peelability characteristics from a food product having a relatively high amount of collagenous material and which is stuffed and processed therein, said method including the steps of;

(a) applying to the inner wall of an inflated length of tubular food casing as the food casing is being shirred a lubricating coating consisting solely of an undiluted, uncatalyzed organosiloxane release and lubricating agent, the release agent being conveyed to the inner wall of the food casing with the stream of air utilized to inflate the food casing in an amount of about 15 drops per each 84-foot length of casing, the organosiloxane release and lubricating agent having the general formulae

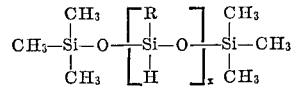

wherein $x$ is an integer of at least 1 and R is a member selected from the class consisting of alkyl, aryl, aralkyl and alkaryl radicals and mixtures thereof wherein R can be different radicals (b) continuing the shirring of and then compacting and compressing the thusly coated food casing until a shirred casing is obtained.

6. The method of claim 5 wherein the organosiloxane release agent is trimethyl siloxane end blocked methyl hydrogen polysiloxane having a viscosity at 25° C. of from about 20 to 40 centistokes.

7. A shirred, regenerated cellulose food casing in which a food emulsion having a relatively high amount of collagenous material is stuffed and processed to obtain a food product, said food casing being characterized in that it has a coating consisting solely of an undiluted, uncatalyzed organosiloxane release agent on its inner wall in an amount at least effective to enable the food casing to be readily and easily removed from the food product stuffed and processed therein but no more than an amount which would adversely affect removal of the food casing from the food product and which would result in the formation of commercially unacceptable amounts of fat and jelly pockets in the food product, said organosiloxane release agent having the general formulae

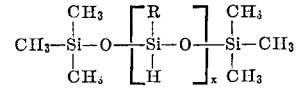

wherein $x$ is an integer of at least 1 and R is a member selected from the class consisting of alkyl, aryl, aralkyl and alkaryl radicals and mixtures thereof wherein R can be different radicals.

8. The food casing of claim 7 wherein the amount of organosiloxane release agent coated on the inner wall of the food casing is about 15 drops per each 84-foot length of casing.

9. The food casing of claims 7 wherein the organosiloxane release agent is trimethyl siloxane end blocked methyl hydrogen polysiloxane having a viscosity at 25° C. of from about 20 to 40 centistokes.

References Cited

UNITED STATES PATENTS

| 2,985,545 | 5/1961 | Leavitt | 99—176UX |
| 3,222,192 | 12/1965 | Arnold | 99—176 |
| 3,307,956 | 3/1967 | Chiu | 99—176 |
| 3,442,663 | 5/1969 | Turbak | 99—176 |

FRANK W. LUTTER, Primary Examiner

R. HALPER, Assistant Examiner

U.S. Cl. X.R.

99—169